United States Patent
An et al.

(10) Patent No.: US 7,207,189 B2
(45) Date of Patent: Apr. 24, 2007

(54) REFRIGERATOR HAVING DISPENSER

(75) Inventors: Si-Yeon An, Gimhae (KR); Seong-Ook Kim, Jinju (KR); Oh-Chul Kwon, Changwon (KR); Ill-Shin Kim, Changwon (KR); Yi-Bum Sik, Buoan (KR); Dong-Yeoi Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/547,543

(22) PCT Filed: Mar. 3, 2004

(86) PCT No.: PCT/KR2004/000453

§ 371 (c)(1),
(2), (4) Date: Sep. 1, 2005

(87) PCT Pub. No.: WO2004/092664

PCT Pub. Date: Oct. 28, 2004

(65) Prior Publication Data

US 2006/0080991 A1    Apr. 20, 2006

(30) Foreign Application Priority Data

Mar. 3, 2003    (KR) .................. 10-2003-0013167

(51) Int. Cl.
*B60H 1/32*    (2006.01)
(52) U.S. Cl. .................. 62/339; 62/389; 165/63; 222/146.6
(58) Field of Classification Search .......... 62/337–339, 62/389–400; 165/61–64; 222/146.6
See application file for complete search history.

(56) References Cited

U.S. PATENT DOCUMENTS

| | | | | |
|---|---|---|---|---|
| 2,341,872 A | * | 2/1944 | Kasold | ......................... 165/63 |
| 2,767,960 A | * | 10/1956 | Fast | ........................... 165/236 |
| 5,442,933 A | | 8/1995 | Unger | |

(Continued)

*Primary Examiner*—William E. Tapolcai
(74) *Attorney, Agent, or Firm*—Birch, Stewart, Kolasch & Birch, LLP

(57) ABSTRACT

A dispenser of a conventional refrigerator supplies only cold water. Therefore, the dispenser cannot meet a variety of users' needs. Further, the conventional refrigerator has a problem in that various kinds of water supplied from a water source cannot be properly purified. The present invention relates to a refrigerator including a main body with a storage space defined therein and a door for opening and closing the storage space. The refrigerator of the present invention comprises a feed tube for guiding water, which is supplied from an external water source to the main body of the refrigerator, to the door; a valve for distributing the water supplied from the feed tube into a plurality of connection tubes; a cooling tank installed within the door for cooling the water supplied through the valve and then storing the cooled water therein; a heater installed within the door for receiving the water supplied through the valve separately from the cooling tank and then heating the received water; and a dispenser for dispensing the hot and cold water supplied from the heater and cooling tank to the outside of the refrigerator through a front surface of the door. The refrigerator further comprises a filter for filtering the water, and the filter is provided at one of the feed tube and connection tubes for supplying the water toward the heater and detachably installed in the storage space defined in the main body of the refrigerator.

30 Claims, 10 Drawing Sheets

U.S. PATENT DOCUMENTS 5,956,967 A    9/1999  Kim
6,029,860 A *  2/2000  Donselman et al. ..... 222/185.1
6,213,199 B1 * 4/2001  Al-Khateeb ................. 165/258

* cited by examiner

REFRIGERATOR HAVING DISPENSER

TECHNICAL FIELD

The present invention relates to a refrigerator, and more particularly, to a refrigerator having a dispenser capable of dispensing hot and cold water.

BACKGROUND ART

Refrigerators recently available in the market have dispensers capable of dispensing ice or water in the refrigerators to the outside without opening doors of the refrigerators. Since the dispensers can allow water or ice in the refrigerator to be dispensed without opening the doors, there are advantages in that they can prevent cold air within the refrigerator from leaking out and also provide a user with convenience of use of the refrigerator. U.S. Pat. No. 6,082,130 discloses an example of a refrigerator having such a dispenser.

FIG. 1 shows a schematic view of the configuration of a conventional refrigerator having a dispenser and icemaker, as described in the '130 patent. As shown in this figure, water supplied from a water source such as a faucet is introduced into a main body 1 of a refrigerator through a supply tube D1 and then purified while passing through a filter 3 installed at a rear side of the main body 1 of the refrigerator. The purified water is supplied to an icemaker 4 or introduced into a water tank 5. Further, a feed valve 6 is installed between the filter 3, icemaker 4 and water tank 5 so that the supply of water into the icemaker 4 and water tank 5 can be controlled.

The icemaker 4 and the water tank 5 are connected to a dispenser 7 through connection tubes D2 and D3, respectively. Ice and water stored in the icemaker and water tank are supplied to the dispenser 7 via the connection tubes D2 and D3, respectively. A user can receive the water and ice from the dispenser 7 through a dispensing port (not shown) provided on a door 2.

According to a prior art as described above, cold water is supplied from the water tank 5 to the dispenser 7. Therefore, there is a problem in that only cold water can be provided through the dispenser 7.

In addition, since the conventional filter 3 cannot remove the lime that produce scale on inner surfaces of the connection tubes D2 and D3, the scale may substantially grow on the inner surfaces of pipes in the refrigerator. Thus, many problems are likely to occur. For example, if scale occurs and grows in the pipes corresponding to water-feeding passages in the refrigerator, there are problems in that after-sale services cannot be easily provided on the pipes and possibility of corrosion on inner parts of the refrigerator can also be increased.

Further, if the scale grow on and peels off from the inner surfaces of the pipes, it is likely to be recognized as if a lump of foreign materials exists in the water or ice supplied from the refrigerator. Therefore, this may result in the decreased reliability of products to the consumers. Furthermore, since heat conductivity of parts in the refrigerator is reduced due to the scale produced within the connection tubes D2 and D3, electric power consumption may be increased.

Moreover, when a heater is installed in the dispenser 7, the aforementioned generation and growth of scale are greatly accelerated, and the above problems due to the generation of scale may become much severer.

DISCLOSURE OF INVENTION

Accordingly, the present invention is conceived to solve the problems in the prior art. An object of the present invention is to provide a refrigerator wherein hot and cold water can be supplied through a dispenser.

Another object of the present invention is to provide a refrigerator wherein scale can be prevented from being produced in pipes of the refrigerator capable of dispending hot water.

A further object of the present invention is to provide a refrigerator having filters capable of performing a variety of filtering actions in accordance with water supplied from a water source.

A still further object of the present invention is to provide a refrigerator wherein parts for supplying water to a dispenser, an icemaker and the like are all provided in a refrigerator door.

According to an aspect of the present invention for achieving the objects, there is provided a refrigerator including a main body for defining a storage space therein and a door for opening and closing the storage space. The refrigerator of the present invention comprises a feed tube for guiding water, which is supplied from an external water source to the main body of the refrigerator, to the door; a valve for distributing the water supplied from the feed tube into a plurality of connection tubes; a cooling tank installed within the door for cooling the water supplied through the valve and then storing the cooled water therein; a heater installed within the door for receiving the water supplied through the valve separately from the cooling tank and then heating the received water; and a dispenser for dispensing the hot and cold water supplied from the heater and cooling tank to the outside of the refrigerator through a front surface of the door.

The refrigerator may further comprise a filter for filtering the water, at one of the feed tube and connection tubes for supplying the water toward the heater, and the filter may be detachably installed in the storage space defined in the main body of the refrigerator.

The filter may include a casing having a water inlet and a water outlet, a first filtering section installed in the casing for removing scale-producing components, and a second filtering section installed in the casing and composed mainly of activated carbon. In such a case, the inlet and the outlet may be formed such that one penetrates through the center of the other.

The first filtering section for removing the scale-producing components may be composed mainly of any one of ion exchange resin and polyphosphate.

The filter may include a casing having a water inlet and a water outlet, and at least one filtering section composed mainly of ion exchange resin, activated carbon, polyphosphate or the combination thereof. In such a case, the inlet and the outlet may be formed such that one penetrates through the center of the other.

The casing may be formed to have a hollow cylindrical shape, and the outlet may be formed to penetrate through the center of the inlet.

The heater may include a heater tube connected to the connection tube for allowing water to flow therein, and a heating wire wrapped around an outer circumferential surface of the heater tube for generating heat through the application of electric power thereto.

The heater may include a thermal energy storage tube installed to surround an outer circumferential surface of the connection tube, a thermal energy storage material provided within the thermal energy storage tube for transfer heat to the water flowing through the connection tube, and a heating wire wrapped around an outer circumferential surface of the thermal energy storage tube for generating heat through the application of electric power thereto and transferring the heat to the thermal energy storage material.

Further, a plurality of heaters may be provided. At least one of the filters may include a heater tube connected to the connection tube for allowing water to flow therein, and a heating wire wrapped around an outer circumferential surface of the heater tube for generating heat through the application of electric power thereto. At least one of the other filters may include a thermal energy storage tube installed to surround around an outer circumferential surface of the connection tube, a thermal energy storage material provided within the thermal energy storage tube for transfer heat to the water flowing through the connection tube, and a heating wire wrapped around an outer circumferential surface of the thermal energy storage tube for generating heat through the application of electric power thereto and transferring the heat to the thermal energy storage material.

Preferably, the feed tube extends into the door to penetrate through a lower hinge of the door, and the door opens and closes a freezing chamber among the storage space.

According to another aspect of the present invention, there is provided a refrigerator including a main body for defining a storage space therein and a door for opening and closing the storage space. The refrigerator comprises a feed tube for guiding water, which is supplied from an external water source to the main body of the refrigerator, to the door; a valve for distributing the water supplied from the feed tube into a plurality of connection tubes; a cooling tank installed within the door for cooling the water supplied through the valve and then storing the cooled water; a heater installed within the door for receiving the water supplied through the valve separately from the cooling tank and then heating the received water; a dispenser for dispensing the hot and cold water supplied from the heater and cooling tank to the outside of the refrigerator through a front surface of the door; and a plurality of filters for filtering the water. Further, the filters are connected to one of the feed tube and connection tubes for supplying the water toward the heater and include filtering sections composed mainly of composition for removing scale-producing components and activated carbon, respectively.

Preferably, the filters are detachably installed within the storage space defined in the main body of the refrigerator.

According to a further aspect of the present invention, there is provided a refrigerator including a main body for defining therein a storage space having refrigerating and freezing chambers and a door for opening and closing the storage space. The refrigerator comprises a feed tube connected to an external water source for guiding water supplied through the main body of the refrigerator to the door; a cooling tank installed within the refrigerating chamber of the storage space defined in the main body of the refrigerator for cooling the water supplied through the feed tube and then storing the cooled water therein; a valve installed within the door for distributing the water supplied from the feed tube into a plurality of connection tubes; a heater installed within the door for receiving the water flowing through the valve into the connection tubes and then heating the received water; a dispenser for dispensing the hot and cold water supplied from the heater and cooling tank to the outside of the refrigerator through a front surface of the door; and a plurality of filters installed at a position on the feed tube for filtering the water supplied from the external water source.

The filter may be detachably installed either within the freezing chamber in the main body of the refrigerator or on the door.

Preferably, the plurality of connection tubes branched off from the valve are connected to the dispenser and the icemaker.

BEST MODE FOR CARRYING OUT THE INVENTION

Hereinafter, a preferred embodiment of a refrigerator having a hot and cold dispenser according to the present invention will be described in detail with reference to the accompanying drawings.

Figure 1:
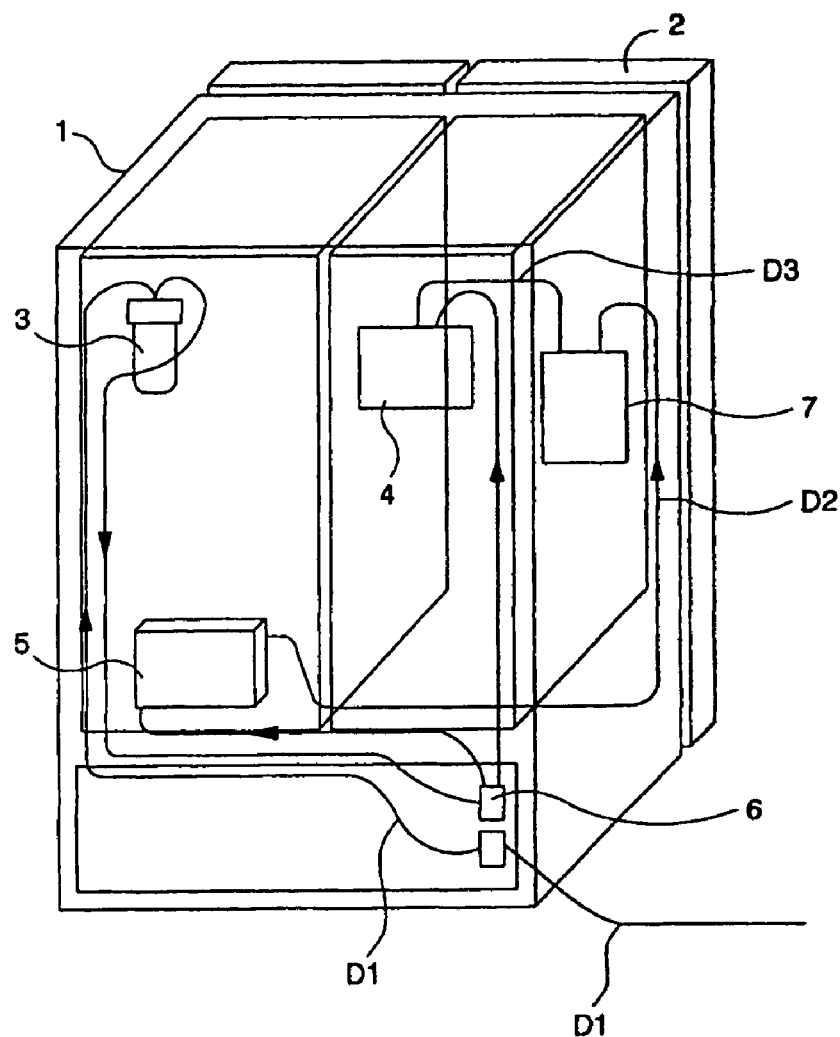
FIG. 1 is a schematic view showing a configuration for supplying water to a dispenser and an icemaker in a conventional refrigerator.
Figure 2:
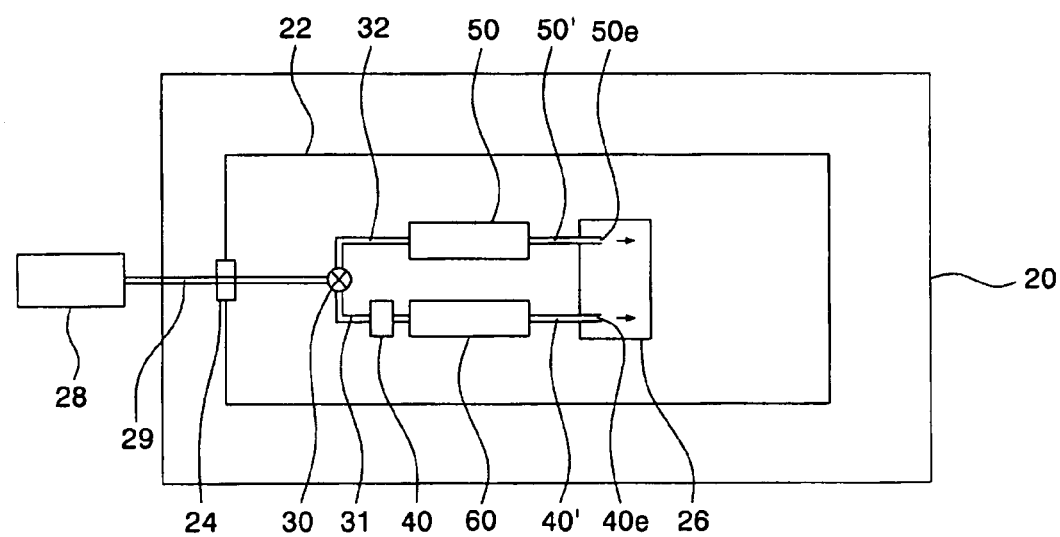
FIG. 2 is a block diagram showing a schematic configuration of a preferred embodiment of a refrigerator having hot and cold dispenser according to the present invention.
Figure 3:
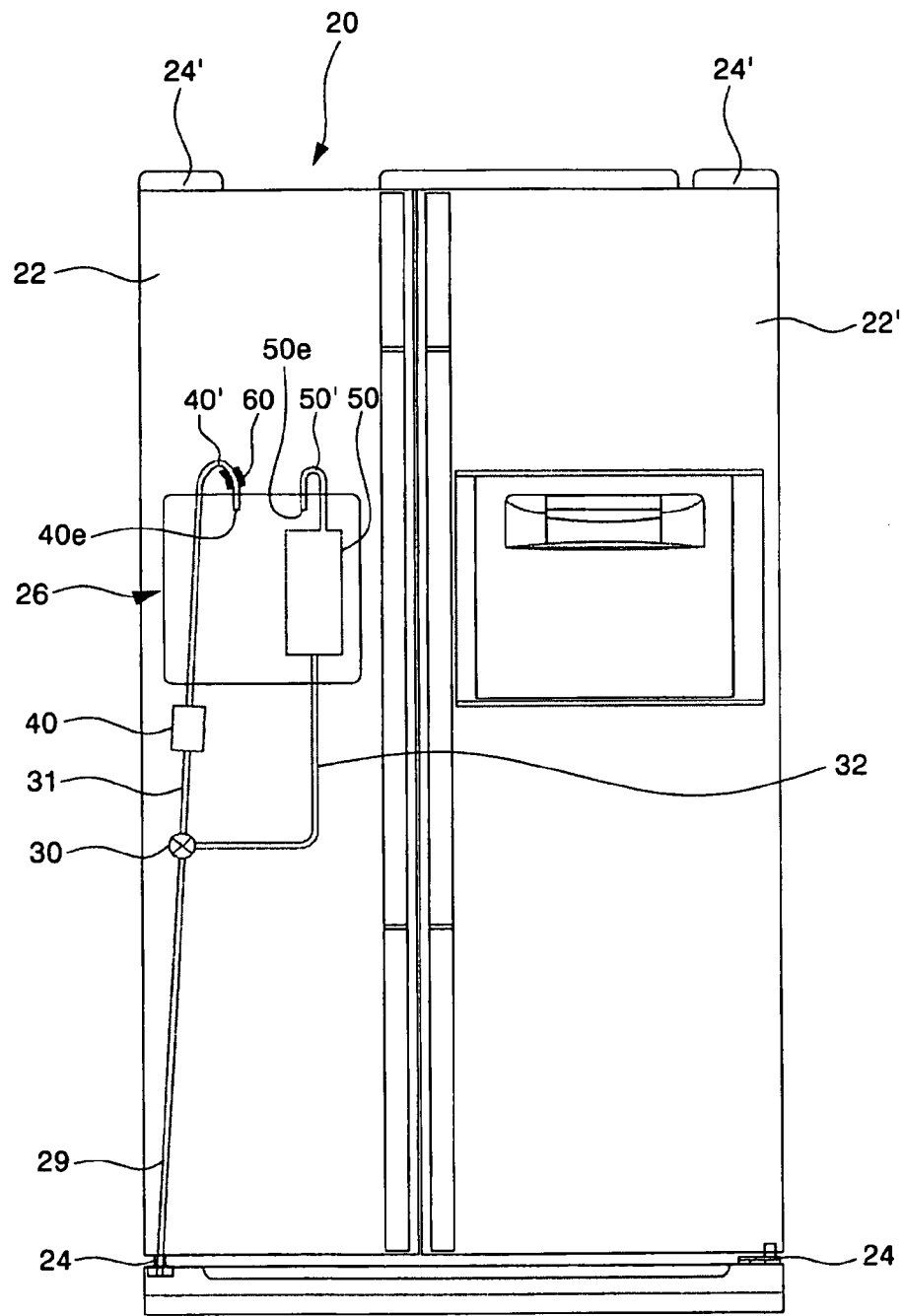
FIG. 3 is a front view showing a configuration of the refrigerator according to the preferred embodiment of the present invention.
Figure 4:
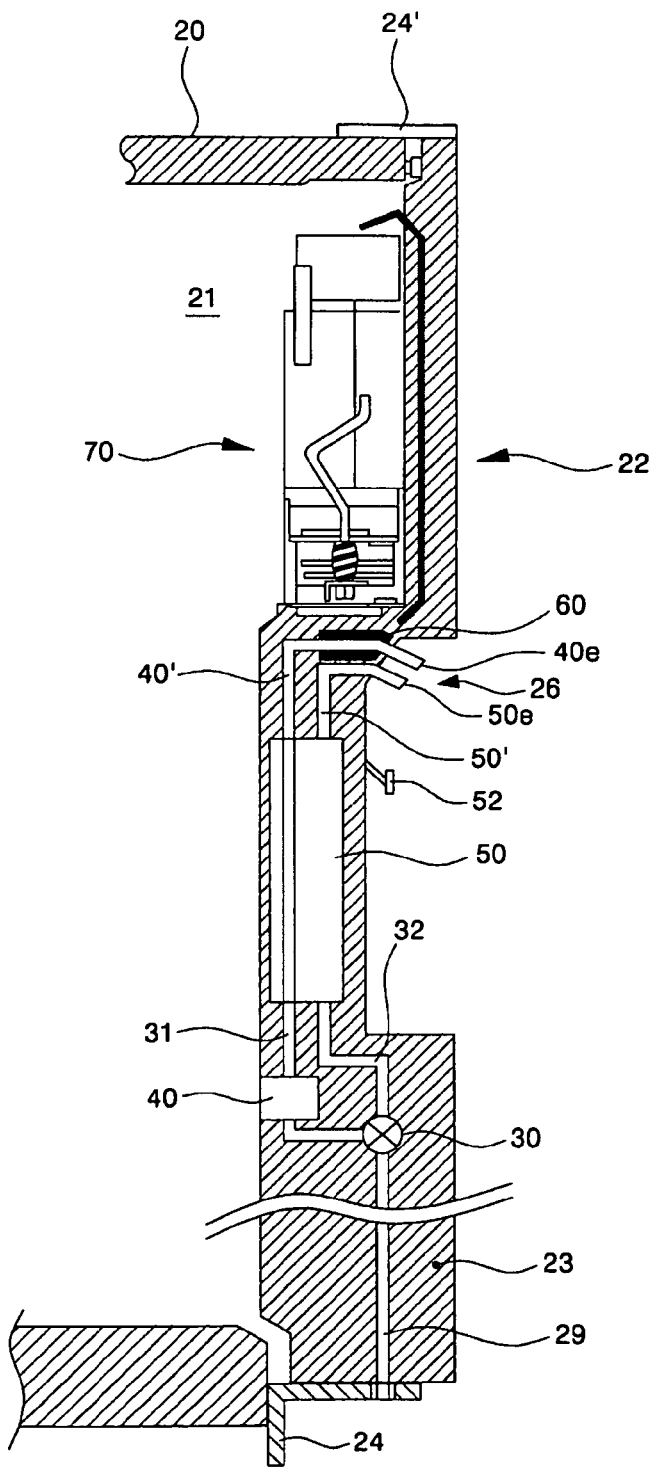
FIG. 4 is a sectional view showing a configuration of a refrigerator door according to the preferred embodiment of the present invention.

Referring first to FIGS. 2 to 4, a refrigerator generally comprises a main body 20 of the refrigerator with a storage space 21 (i.e., refrigerating and freezing chambers) included therein, and a door 22 for opening and closing the storage space 21 of the main body 20 of the refrigerator. In general, a large refrigerator, i.e. a side-by-side refrigerator, is vertically formed with a freezing chamber at a left side thereof and a refrigerating chamber at a right side thereof.

In addition, the freezing and refrigerating chambers corresponding to the storage space are opened and closed by the doors 22 and 22', respectively. An insulating layer 23 is formed in each of the doors 22 and 22'. Each of the doors 22 and 22' is pivotally supported on the main body 20 of the refrigerator at a vertical side thereof by lower and upper hinges 24 and 24'. A dispenser 26 is provided on a front surface of the door 22 for the freezing chamber. Further, a home bar, a display unit or the like may be provided on a front surface of the door 22' for the refrigerating chamber.

Water is supplied into the main body 20 of the refrigerator from an external water source 28. To this end, the main body 20 of the refrigerator is connected to the water source 28 through a feed tube 29. Here, an additional filter provided within the storage space 21 of the main body 21 of the refrigerator may be connected to the feed tube 29 that connects the water source 28 and the main body 20 of the refrigerator. The feed tube 29 passes through the lower hinge 24 and extends into the door 22. Further, the feed tube 29 is covered with the insulating layer 23 within the door 22.

The feed tube 29 is also connected to a valve 30 within the door 22. The valve 30 serves to distribute water supplied through the feed tube 29 into the dispenser 26, an icemaker 70 and the like, which will be described later. Only connection tubes 31 and 32 for supplying water to the dispenser 26 are shown in FIG. 2. However, an additional connection tube (not shown) is also connected to the icemaker 70.

A filter 40 is provided in the connection tube 31. The filter 40 serves to filter water that will be supplied to a heater 60 to be explained later. In particular, the filter 40 can filter out scale-producing components within the connection tube 31 when water is heated by the heater 60. Here, the scale-producing components include calcium ions, magnesium ions or the like contained in the service water.

The filter 40 is manufactured using an ion exchange resin and can filter out a variety of different impurities including calcium or magnesium ions. That is, different components other than calcium or magnesium ions can also be removed. Alternatively, the filter 40 may cause the calcium or magnesium ions in the water to not produce the scale using polyphosphate. Of course, the polyphosphate is one of the ion exchange resins, but it is used to remove only the calcium or magnesium ions.

An outlet of the filter 40 is connected to a connection tube 40' which in turn extends to the dispenser 26. The connection tube 40' is provided with a hot water outlet 40e at an end thereof. A valve (not shown) for regulating the discharge of hot water from the connection tube 40' via the hot water outlet 40e is provided at the hot water outlet 40e.

Furthermore, the filter 40 may be installed such that it can be connect not to the connection tube 40' but to the feed tube 29 placed in the interior of the door 22. In such a case, all the water supplied to the dispenser 26 and the icemaker 70 can be purified by the filter 40.

The connection tube 32 is connected to a cooling tank 50. The cooling tank 50 is installed at the interior of the door 22, and preferably, is provided at the interior of the insulating layer 23. The cooling tank 50 serves to lower the temperature of water supplied therein to a certain temperature or lower.

An outlet of the cooling tank 50 is connected to a connection tube 50' which in turn extends to the dispenser 26. The connection tube 50' is provided with a cold water outlet 50e at an end thereof. A valve (not shown) for regulating the discharge of cold water from the connection tube 50' via the cold water outlet 50e is also provided at the cold water outlet 50e. Further, a lever 52 is installed for opening and closing the valves provided respectively at the hot water outlet 40e and the cold water outlet 50e.

Although it has been described in this embodiment that the cooling water 50 is installed in the door 22, the cooling water is not necessarily installed in the door 22 but may be provided in the freezing chamber among the storage space 21. In other words, as another example of the present invention, the feed tube 29 may be installed to penetrate through the main body 20 of the refrigerator. In such a case, of course, it is preferred that the filter 40 be installed on the feed tube 20 downstream of the cooling tank 50. Further, the water of which temperature is relatively lowered in the cooling tank 50 is distributed into the relevant portions.

The heater 60 is provided at the connection tube 40'. The heater 60 serves to heat the water passing though the connection tube 40' and discharged through the hot water outlet 40e. The supplied water is converted in the icemaker 70.

Hereinafter, a specific configuration of the filter 40 will be described in detail. As described above, the filter 40 may be installed either at a certain position of the connection tube 31 downstream of the heater 60 or at a certain position of the feed tube 29. The filter may be alternatively installed at a position after or before the lower hinge 24. That is, in a case where the installation position of the filter at the feed tube 29 is downstream of the lower hinge 24, the filter 40 may be installed at the main body 20 of the refrigerator, for example, within the freezing chamber of the storage space 21. On the other hand, in a case where the installation position of the filter is upstream of the lower hinge 24, the filter 40 may be installed at the door 22, for example, on an inner surface of the door 22. At this time, if the door 22 corresponds to the door for a freezing chamber, the filter is preferably installed such that it cannot be subjected to an influence of the temperature in the freezing chamber.

Since the filter 40 is installed at a position accessible through the storage space 21 in the main body 20 of the refrigerator as described above, a user can easily exchange the filter 40. This is because the filter 40 should be exchanged when its filtering performance is deteriorated after it has been used for a certain period of time. It is obvious that various modifications can be made on the configuration in which the filter 40 is detachably installed in the storage space in the refrigerator.

The inner configuration of the filter 40 is described in detail with reference to FIG. 5. A casing 41 of the filter 40 defines an external appearance of the filter. The casing 41 is generally configured to have a cylindrical shape and is formed with a water inlet 43 at an end thereof. Water can be introduced into the filter 40 through the water inlet 43. A water outlet 44, through which filtered water is discharged, is formed to be centered on the water inlet 43. That is, the water inlet and outlet 43 and 44 are provided at the same end of the casing 41. This allows the structure of the feed tube 29 connected to the inlet 43 and the outlet 44 to be simplified and the filter 40 to be connected with the feed tube 29 by merely mounting the filter 40 to an inner wall of the storage space 21.

The inlet 43 and the outlet 44 communicate with each other via a central passage 45 extending through the casing 41 along a centerline thereof. First and second filtering sections 46 and 47 are provided in the casing 41 for filtering the water supplied into the casing 41 through the inlet 43. The first filtering section 46 is provided at a space defined between an inner circumferential surface of the casing 41 and an outer circumferential surface of the central passage 45. The first filtering section 46 serves to get rid of the cause of the scale that may be produced in the water passages. That is, the first filtering section 46 is composed of ion exchange resin that can capture a variety of components, including calcium and magnesium ions, by which the scale may be produced.

Alternatively, the first filtering section 46 may be composed of polyphosphate. The polyphosphate reacts with the calcium and magnesium ions contained in the water such that it cannot be agglomerated into a lime while flowing through the pipes. If the first filtering section 46 is composed of the polyphosphate in the form of particles with constant sizes, the water flow through voids formed between particles. The calcium and magnesium ions contained the flowing water react the polyphosphate and thus become in a state where they cannot be agglomerated into the lime.

The second filtering section 47 is provided in the casing 41 opposite to the water inlet 43. The second filtering section 47 is provided next to the most downstream portion of the first filtering section 46. The second filtering section 47 is formed to have an annular shape such that water can flow from the exterior to the center. To this end, the second filtering section 47 is provided between a flange portion 49 of the central passage 45 and an innermost support 49'. Thus, the water passing through the first filtering section 46 is transferred to the exterior of the second filtering section 47, and flows into the center of the second filtering section 47, and is then transferred into the central passage 45.

The second filtering section is composed mainly of activated carbon and performs a water purification function by adsorbing basic foreign materials. Of course, the second filtering section may contain other compositions that are impregnated therein to filter out the different foreign materials.

Figure 5:
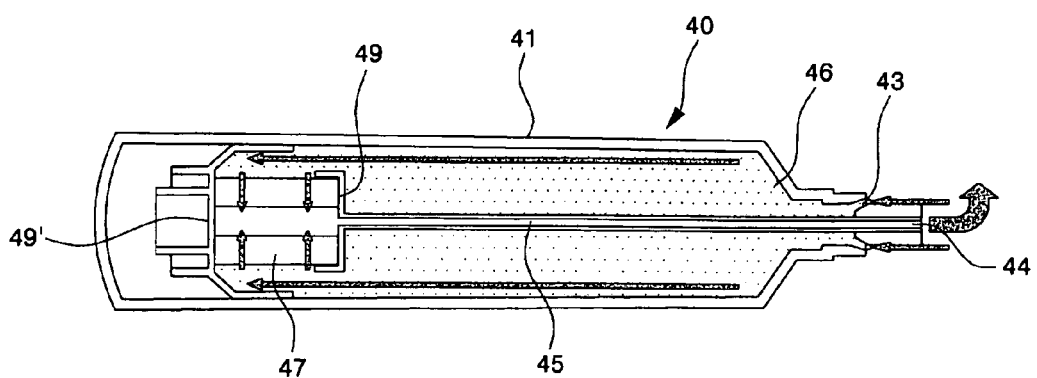
FIG. 5 is a sectional view showing an example of a filter according to the preferred embodiment of the present invention.

In the filter 40 shown in FIG. 5, the compositions of the first and second filtering sections 46 and 47 may be interchanged with each other. In other words, the second filtering section 47 may be composed mainly of the ion exchange resin and polyphosphate capable of removing the materials that produce the lime, while the first filtering section 46 may be composed mainly of the activated carbon.

Next, another embodiment of the filter will be explained with reference to FIG. 6. A casing 141 of the filter 140 of this embodiment defines an external appearance of the filter. The casing 141 is formed with a water inlet 143 at an end thereof. Water can be introduced into the filter 140 through the water inlet 143. A water outlet 144, through which the filtered water is discharged, is formed to be centered on the water inlet 143. That is, the water inlet and outlet 143 and 144 are provided at the same end of the casing 141. This filter 140 has the same configuration as the filter of the previous embodiment shown in FIG. 5.

The inlet 143 and the outlet 144 communicate with each other via a central passage 145. First, second and third filtering sections 146, 147 and 148 are sequentially provided in the casing 141 to filter the water introduced therein through the inlet 143. The first filtering section 146 is formed to have a hollow cylindrical shape and to extend in a longitudinal direction of the casing 141 along the outermost periphery within the casing 141, the second filtering section 147 is also formed in the first filtering section 146 to have a hollow cylindrical shape, and the third filtering section 147 is formed in the second filtering section 147 to have a solid cylindrical shape.

Here, the first filtering section 146 is composed of ion exchange resin capable of capturing other components as well as the calcium and magnesium ions contained in the water. The second filtering section 147 corresponds to a portion to which water passing through the first filtering section 146 is transferred, and is composed of activated carbon for improving the smell and taste of water due to the foreign materials. The third filtering section 148 corresponds to a portion to which water passing through the second filtering section 147 is transferred, and is composed of polyphosphate for mainly removing the calcium and magnesium ions contained in the water to prevent the lime from being agglomerated therein.

Furthermore, the filtering sections 146, 147 and 148 are positioned between a flange portion 149 and a support 149.

Of course, the first filtering section 146 communicates with the water inlet 143 at a side of the flange portion 149. A central passage 145 that communicates with the third filtering section 148 is formed at the center of the flange portion 149.

In addition to the aforementioned concentric arrangement of the filtering sections, the filtering sections 146, 147 and 148 of this embodiment of the present invention can be configured in various manners if the water supplied into the inlet 142 passes through all the filtering sections and is then discharged through the outlet 143 to the outside.

In general, a pre-filter composed of a non-woven fabric with a certain mesh size may be included in the filtering section. Such a pre-filter may be installed in each of the filtering sections of the present invention to perform a function of filtering out foreign materials.

Figure 7:
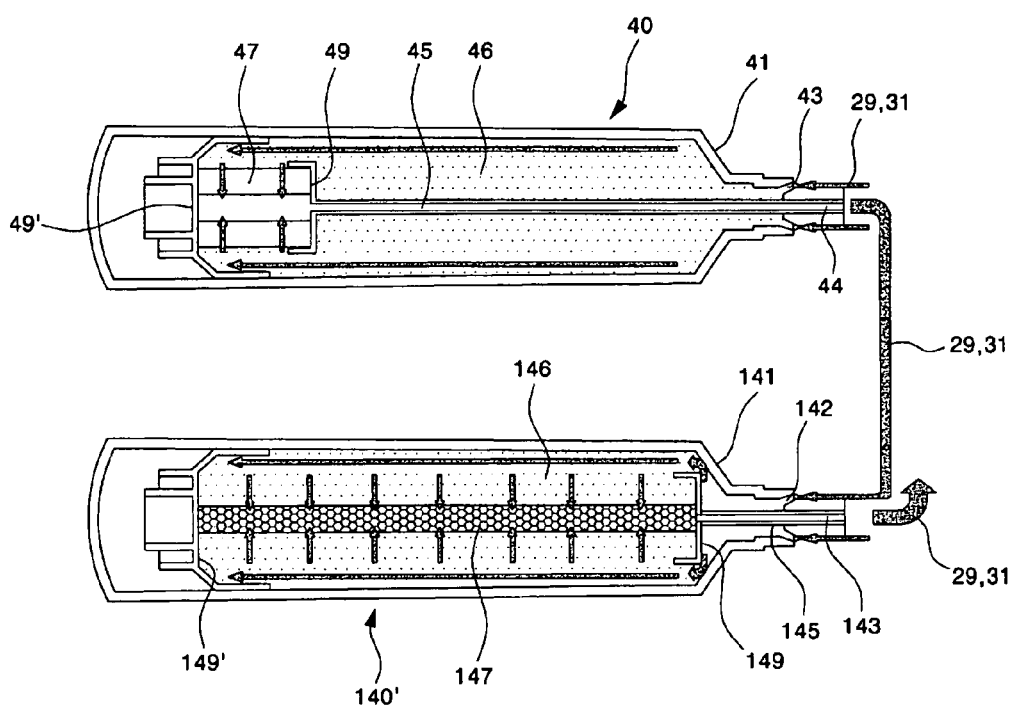
FIG. 7 is a view showing an example in which a plurality of filters are employed in the preferred embodiment of the present invention.

Next, a combination of the plurality of filtering sections can be employed, depending on ingredients of water supplied from the water source 28. FIG. 7 shows an example in which the plurality of filters are employed. That is, the aforementioned filter 40 and an additional filter 140' having the filtering section configuration different from that of the filter 140 are sequentially disposed according to the water flow. In other words, the filter 40 is disposed relatively upstream of the feed tube 29 while the filter 140' is disposed relatively downstream of the feed tube 29.

Here, the filter 140' comprises a first filtering section 146 composed mainly of activated carbon and a second filtering section composed mainly of polyphosphate. The first filtering section 146 is formed to have a hollow cylindrical shape and to extend between the flange portion 149 and the support 149' such that the water can flow from the exterior to the center thereof, while the second filtering section 147 is formed in the first filtering section 146 to have a solid cylindrical shape.

Figure 8:
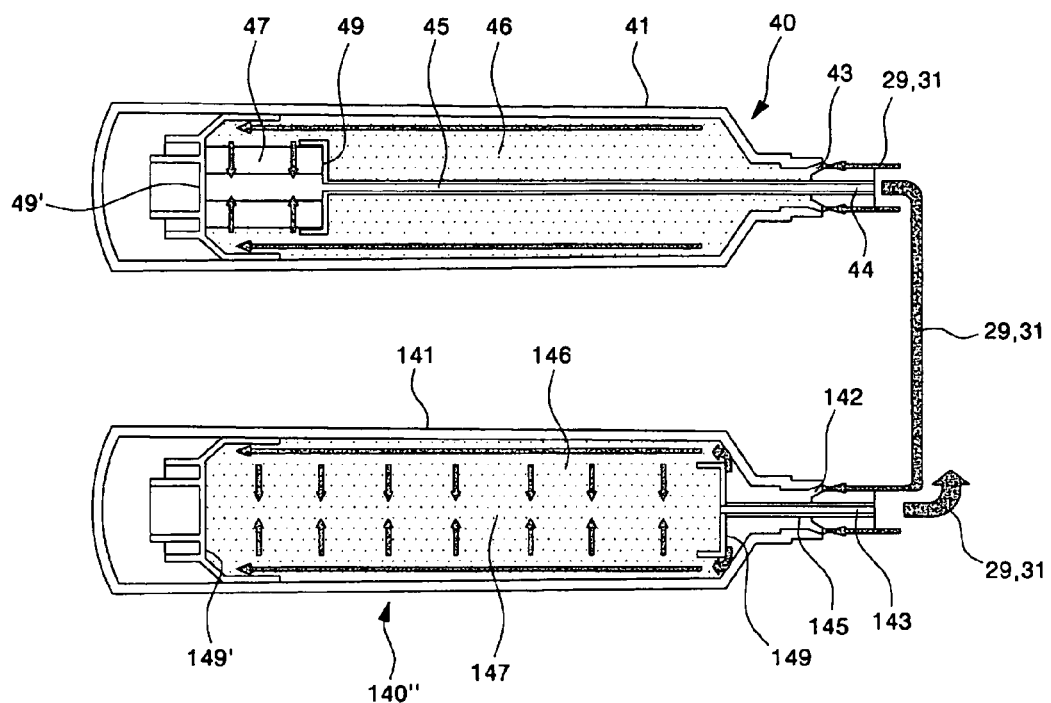
FIG. 8 is a view showing another example in which a plurality of filters are employed in the preferred embodiment of the present invention.

FIG. 8 also shows an example in which the plurality of filters are employed. That is, the aforementioned filter 40 and an additional filter 140" having the filtering section configuration different from those of the filters 140 and 140' are sequentially disposed according to the water flow. Here, the filter 140" comprises only a first filtering section 146 composed mainly of activated carbon.

As described above, FIGS. 7 and 8 show the examples in which two filters 40 and 140' or 40 and 140" are provided. However, a variety of combinations of the respective filters 40, 140, 140' and 140" may be employed. That is, depending on the ingredients of water supplied from the water source 28, the filters may be properly combined such that most efficient water purification can be performed.

Figure 9:
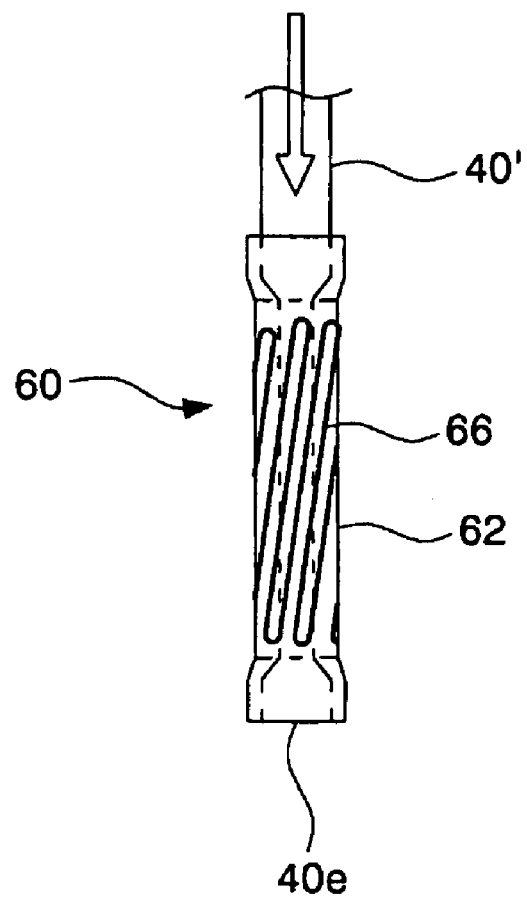
FIG. 9 is an external view showing an example of a heater according to the preferred embodiment of the present invention.

Next, the heater for allowing the dispenser to supply hot water will be explained. First, the heater 60 shown in FIG. 9 is a kind of instant heater and has a configuration in which a heating wire 66 is wrapped around a heater tube 62 connected to an end of the connection tube 40'. That is, the heater tube 62 is made of metal with high heat conductivity, and the heating wire 62 for generating heat by applying electrical power thereto are wrapped around an outer circumferential surface of the heater tube 62.

The configuration of the heater 60 may be modified in various manners, if the heater can heat the water flowing through the heater tube 62. Here, the length of the heater tube 62 and the area of the heating wire wrapped around the external surface thereof should vary according to the various conditions such as the flow rate and temperature of water to be supplied thereto. This is because the heater should be designed such that the temperature of the finally discharged hot water can be regulated to a desired value.

Figure 10:
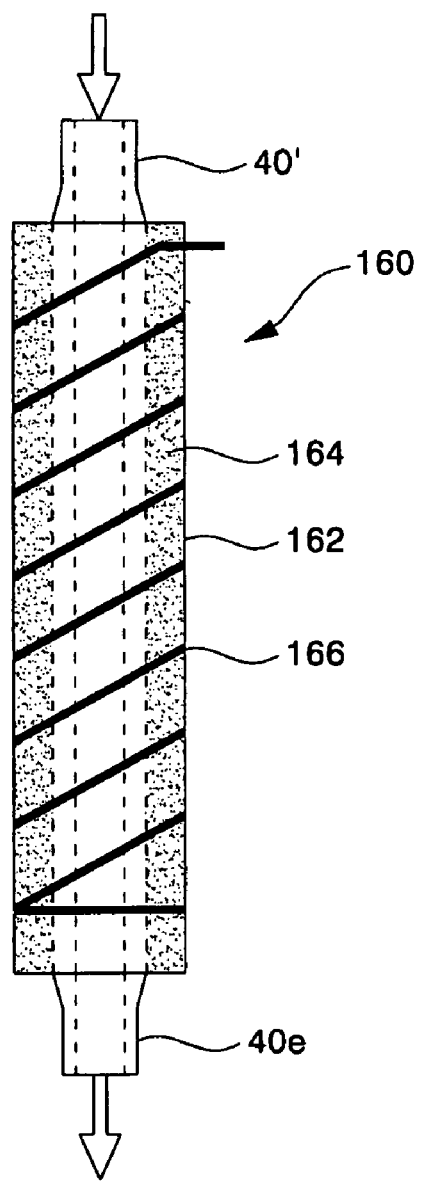
FIG. 10 is an external view showing another example of a heater according to the preferred embodiment of the present invention.

FIG. 10 shows another example of the heater. That is, a heater 160 is obtained in such a manner that a thermal energy storage material 164 is installed within a thermal energy storage tube 162 and a heating wire 166 is wrapped around an external surface of the tube 162. The connection tube 40' passes through the center of the thermal energy storage tube 162 of the heater 160. In other words, the heater 160 is configured in such a manner that the connection tube 40' is surrounded with the thermal energy storage tube 162.

The thermal energy storage material 164 is kept at a certain high temperature state due to the heating by the heating wire 166. Then, the high-temperature heat is transferred to the water flowing through the connection tube 40'. Any materials may be used as the thermal energy storage material 164 if they have the aforementioned property.

For example, the thermal energy storage material 164 is adequate for the present invention, if it can be in the high temperature state (in a liquid or gas phase at a high temperature) by means of the heating wire 166 and then the high-temperature heat can be transferred to the water flowing through the connection tube 40'. Further, when the heat is transferred to the water flowing through the connection tube 40', the thermal energy storage material with a phase-change property may be employed.

A material with high specific heat, and more generally, water may be used as the thermal energy storage material 164. In a case where water is used as a thermal energy storage material, the water corresponding to the thermal energy storage material is heated by means of the heating wire 166 from which heat is generated by applying electric power thereto, and is then kept at a high temperature state. In such a state, when water is supplied into the connection tube 40', the heat stored in the thermal energy storage material 164 is transferred to the water flowing the connection tube 40' and the hot water can be dispensed from the dispenser 26 accordingly. If an area in which the connection tube 40' is surrounded with the thermal energy storage tube 162 is properly selected in such a heater 160, the temperature of the finally discharged hot water can also be regulated to a desired value.

Figure 11:
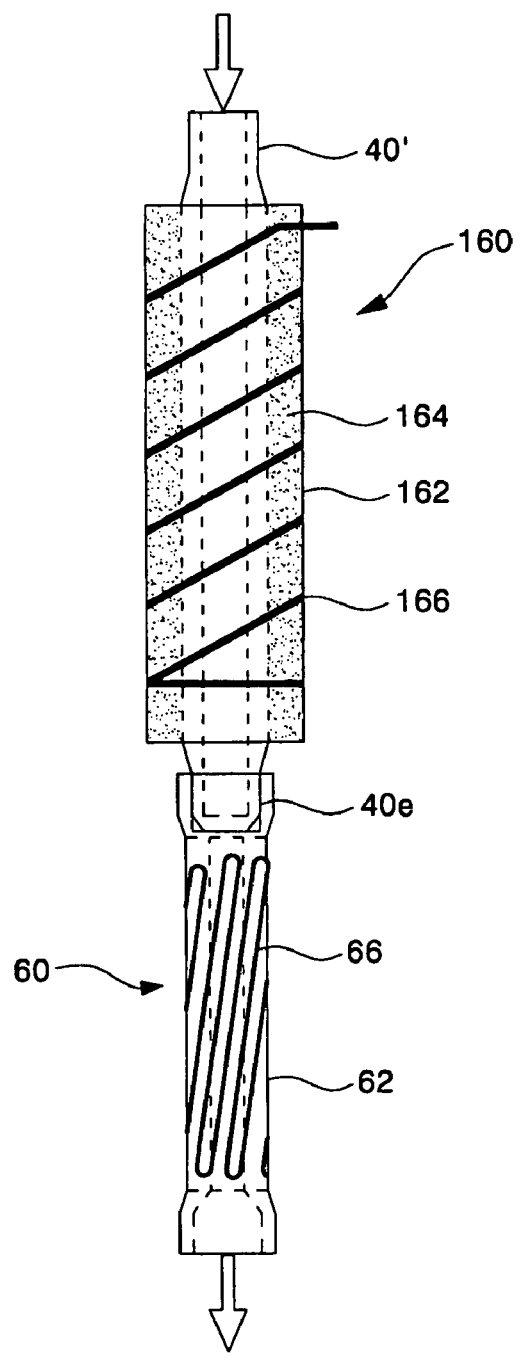
FIG. 11 is an external view showing an example in which a plurality of heaters are employed in the preferred embodiment of the present invention.

As shown in FIG. 11, the two heaters 60 and 160 can be simultaneously employed. That is, the heater 160 is installed to surround the connection tube 40', and the heater 60 is sequentially installed by fitting the end of the connection tube 40' into the heater tube 62. In a state where the two heaters 60 and 160 are simultaneously employed as described above, the respective heaters 60 and 160 may be relatively shortened.

Hereinafter, the operation of the refrigerator having the hot and cold dispenser according to the present invention configured as described above will be explained in detail.

Water is supplied from the water source 28 to the main body 20 of the refrigerator through the feed tube 29. The feed tube 29 is connected to the valve 30 disposed in the door 22 from the main body 20 of the refrigerator through the lower hinge 24 of the door 22. The valve 30 distributes the water into the dispenser 26 and the icemaker 70 through the connection tubes 31 and 32.

At this time, the filters 40, 140, 140' and/or 140" for purifying the water are installed on the feed tube 29 disposed at either the main body 20 of the refrigerator or the door 22. Of course, the filter 40 may be installed at the connection tube 31 as illustrated in the embodiment shown in the figures.

The filter 40 is installed on an inner side of the main body 20 of the refrigerator and exchanged after it has been used for a certain period of time. Since the inlet 43 and the outlet 44 are placed at the same end of the filter 40, the structure of the feed water 29 can be more simplified. Further, the inlet 43 and outlet 44 of the filter 40 can be properly connected to the feed tube 29 by merely installing the filter 40 at a desired installation position of the main body 20 of the refrigerator.

That is, the calcium and magnesium ions causing the scale are removed from the water flowing through the inlet 43 while the water passes through the first filtering section 46. Therefore, the scale can be prevented from being produced in the various kinds of parts or pipes used to guide the water within the refrigerator. In particular, when the temperature of water is raised using the heater 60, an amount of scale to be produced can be further increased. Thus, the filter can be much more useful when the hot water is supplied by using the heater 60.

The first filtering section 46 is composed mainly of ion exchange resin or polyphosphate. The ion exchange resin can capture the calcium and magnesium ions that cause the scale to be produced. Further, since the polyphosphate is coated around the calcium and magnesium ions and on the inner surfaces of the pipes (i.e., it reacts with the ions), the calcium and magnesium ions cannot be agglomerated into the lime when flowing into the pipes.

The water passing through the first filtering section 46 is transferred to the second filtering section 47. In the second filtering section 47, the foreign materials are removed from the water flowing from the outer circumferential surface thereof to the center thereof. Since the filtering section 47 is composed mainly of activated carbon, the foreign materials and the resultant smell are removed from the water. If there is something that should be removed from the ingredients of water supplied from the water source 28, the compositions corresponding to the components to be removed may be beforehand impregnated in the second filtering section 47. The water passing through the second filtering section 47 is transferred to the outlet 44 through the central passage 45 and then to either feed tube 29 or the connection tube 32.

Figure 6:
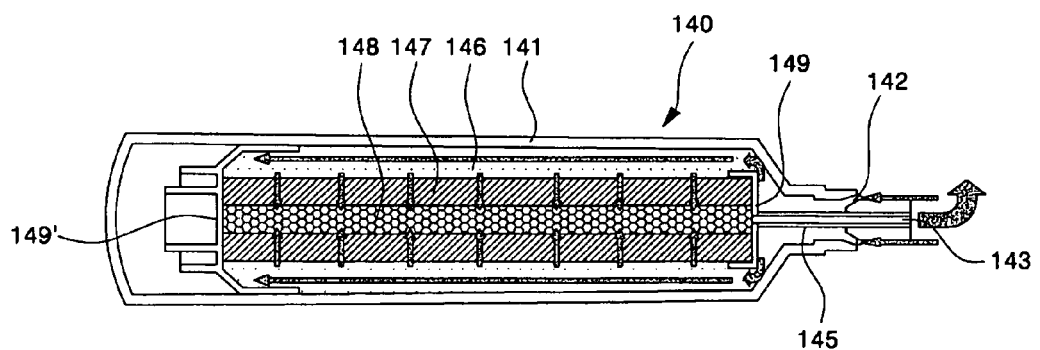
FIG. 6 is a sectional view showing another example of the filter according to the preferred embodiment of the present invention.

On the other hand, in a case where the filter 140 of FIG. 6 is employed, the water transferred from the feed tube 29 or the connection tube 32 is introduced into the casing 141 through the inlet 142. The water is purified in the casing 141 while sequentially passing through the first, second and third filtering sections 146, 147 and 148.

Here, since the first filtering section 146 is composed of ion exchange resin, it captures the calcium or magnesium ions. Then, since the second filtering section 147 is composed mainly of activated carbon, it removes the foreign materials, the resultant smell or the like from the water. Finally, since the third filtering section 148 is composed mainly of polyphosphate which is coated around the calcium and magnesium ions and on the inner surfaces of the pipes (i.e., the polyphosphate reacts with the ions), the calcium and magnesium ions cannot be agglomerated into the lime when flowing into the pipes. Thus, the occurrence of scale is prevented.

The water passing sequentially through the first, second and third filtering sections 146, 147 and 148 is transferred to the outlet 143 through the central passage 145, and then, again to either feed tube 29 or the connection tube 31.

Furthermore, FIGS. 7 and 8 show an example in which the plurality of filters 40, 140, 140' and 140" are used. In such a case, the filtering sections may have duplicate compositions from one another. The reason is as follows.

That is, the filtering section composed of polyphosphate has a relatively long life whereas the filtering section composed of ion exchange resin has a relatively short life.

Therefore, in a case where the two filtering sections are installed in the same casing, it is difficult to set a proper exchange time because their lives are different from each other.

Further, since there may be some differences in the ingredients contained in the water depending on the areas where the refrigerator is used, the same compositions are repeatedly included in the filters 40, 140, 140' and 140" such that the water purification efficiency can be improved and the exchange time thereof can be properly set.

In the meantime, the purified water is continuously supplied through the feed tube 29 or the connection tube 32. For example, when the filters 40, 140, 140' and 140" are installed upstream of the valve 30, the water passing through the filters 40, 140, 140' and 140" is divided in the valve 30 and transferred to the dispenser 26 through the connection tubes 31 and 32, respectively. Further, the water is transferred to the icemaker 70 through an additional connection tube.

The water supplied into the connection tube 31 is heated in the heater 60 and/or 160 and then discharged through the outlet 40e of the connection tube 40' by the operation of the operating lever 52. At this time, the operation of the lever 52 causes an additional valve to be actuated so that the discharge of water through the outlet 40e can be regulated.

The water supplied into the connection tube 32 is first stored in the cooling tank 50 in which the water is in turn cooled to a desired temperature. Then, the cooled water is discharged through the outlet 50e to the outside by operating the lever 52 that actuates the valve provided at the outlet 50e of the connection tube 50' to be opened and closed.

As described above, the water supplied from the water source 28 is divided in the valve 30 and then distributed toward the heater 60 and/or 160 and the cooling tank 50. Thus, the water of a room temperature is supplied to the connection tube 40' on which the heater 60 and/or 160 is provided. In such a case, even though the heat capacity supplied from the heater 60 and/or 160 is relatively low, the heating of water up to a desired temperature can be quickly made and the electric power consumption can also be reduced.

INDUSTRIAL APPLICABILITY

According to the present invention as described above, it is expected to obtain the following advantages.

First, since hot and cold water can be supplied through the dispenser provided on the door, there is an advantage in that the convenience of use is further enhanced as compared with the refrigerator in which only cold water is generally dispensed.

In addition, according to the present invention, the water supplied from the external water source is supplied directly to the dispenser, icemaker and the like using the filter. Since it is designed that the filter can be easily installed in the door and the main body of the refrigerator, there is another advantage in that the filter can be easily exchanged, if necessary.

In particular, since the filter is configured to include the filtering section(s) composed mainly of ion exchange resin or polyphosphate, the scale cannot be produced in the flow path in or inner parts of the refrigerator. Therefore, there is a further advantage in that more cleanly purified water can be supplied to the refrigerator.

In addition, the plurality of filters are used to allow the water to be suitably purified depending on the ingredients of water supplied from the water source. Therefore, there is a still further advantage in that the filter exchange time can be most efficiently set.

Furthermore, since the water supplied from the water source is distributed into a portion where hot water is produced and a portion where cold water is produced. Therefore, there is another advantage in that electric power consumption required for producing the hot and cold water can be relatively reduced.

Moreover, the dispenser, the icemaker and other parts used to supply water to the dispenser and icemaker are generally installed to the door. Therefore, there are other advantages in that the configuration of the main body of the refrigerator can be relatively simplified and the manufacturer can produce a variety of refrigerators with different designs by merely exchanging the door.

The scope of the present invention is not restricted to the embodiment described above but only defined by the appended claims. It is apparent to those skilled in the art that various modifications and changes can be made within the scope of the invention.

The invention claimed is:

1. A refrigerator including a main body for defining a storage space therein and a door for opening and closing the storage space, comprising:
    a feed tube for guiding water, which is supplied from an external water source to the main body of the refrigerator, to the door;
    a valve for distributing the water supplied from the feed tube into a plurality of connection tubes;
    a cooling tank installed within the door for cooling the water supplied through the valve and then storing the cooled water therein;
    a heater installed within the door for receiving the water supplied through the valve separately from the cooling tank and then heating the received water; and
    a dispenser for dispensing the hot and cold water supplied from the heater and cooling tank to the outside of the refrigerator through a front surface of the door.

2. The refrigerator as claimed in claim 1, further comprising a filter for filtering the water, wherein the filter is provided at one of the feed tube and connection tubes for supplying the water toward the heater and detachably installed in the storage space defined in the main body of the refrigerator.

3. The refrigerator as claimed in claim 2, wherein the filter includes:
    a casing having a water inlet and a water outlet;
    a first filtering section installed in the casing for removing scale-producing components; and
    a second filtering section installed in the casing and composed mainly of activated carbon,
    wherein the inlet and the outlet are formed such that one penetrates through the center of the other.

4. The refrigerator as claimed in claim 3, wherein the first filtering section for removing the scale-producing components is composed mainly of any one of ion exchange resin and polyphosphate.

5. The refrigerator as claimed in claim 4, wherein the casing is formed to have a hollow cylindrical shape, a central passage extends through a longitudinal centerline of the casing to communicate with the water outlet such that the water passing through the first and second filtering sections is guided to the outlet through the central passage, and the outlet is formed to penetrate through the center of the inlet.

6. The refrigerator as claimed in claim 2, wherein the filter includes:

a casing having a water inlet and a water outlet; and
at least one filtering section composed mainly of ion exchange resin, activated carbon, polyphosphate or the combination thereof,
wherein the inlet and the outlet are formed such that one penetrates through the center of the other.

7. The refrigerator as claimed in claim 6, wherein the casing is formed to have a hollow cylindrical shape, a central passage extends through a longitudinal centerline of the casing to communicate with the water outlet such that the water passing through the filtering section is guided to the outlet through the central passage, and a flange portion and a support are provided at both ends of the filtering section.

8. The refrigerator as claimed in claim 1, wherein the heater includes:
a heater tube connected to the connection tube for allowing water to flow therein; and
a heating wire wrapped around an outer circumferential surface of the heater tube for generating heat through the application of electric power thereto.

9. The refrigerator as claimed in claim 1, wherein the heater includes:
a thermal energy storage tube installed to surround an outer circumferential surface of the connection tube;
a thermal energy storage material provided within the thermal energy storage tube for transfer heat to the water flowing through the connection tube; and
a heating wire wrapped around an outer circumferential surface of the thermal energy storage tube for generating heat through the application of electric power thereto and transferring the heat to the thermal energy storage material.

10. The refrigerator as claimed in claim 1, wherein a plurality of heaters are provided; at least one of the filters includes a heater tube connected to the connection tube for allowing water to flow therein, and a heating wire wrapped around an outer circumferential surface of the heater tube for generating heat through the application of electric power thereto; and at least one of the other filters includes a thermal energy storage tube installed to surround around an outer circumferential surface of the connection tube, a thermal energy storage material provided within the thermal energy storage tube for transfer heat to the water flowing through the connection tube, and a heating wire wrapped around an outer circumferential surface of the thermal energy storage tube for generating heat through the application of electric power thereto and transferring the heat to the thermal energy storage material.

11. The refrigerator as claimed in claim 1, wherein the feed tube extends into the door to penetrate through a lower hinge of the door.

12. The refrigerator as claimed in claim 1, wherein the door opens and closes a freezing chamber among the storage space.

13. A refrigerator including a main body for defining a storage space therein and a door for opening and closing the storage space, comprising:
a feed tube for guiding water, which is supplied from an external water source to the main body of the refrigerator, to the door;
a valve for distributing the water supplied from the feed tube into a plurality of connection tubes;
a cooling tank installed within the door for cooling the water supplied through the valve and then storing the cooled water;
a heater installed within the door for receiving the water supplied through the valve separately from the cooling tank and then heating the received water;
a dispenser for dispensing the hot and cold water supplied from the heater and cooling tank to the outside of the refrigerator through a front surface of the door; and
a plurality of filters for filtering the water,
wherein the filters are connected to one of the feed tube and connection tubes for supplying the water toward the heater and include filtering sections composed mainly of composition for removing scale-producing components and activated carbon, respectively.

14. The refrigerator as claimed in claim 13, wherein the filters are detachably installed within the storage space defined in the main body of the refrigerator.

15. The refrigerator as claimed in claim 13, wherein at least one of the filters includes a casing having a water inlet and a water outlet, a first filtering section installed in the casing for removing scale-producing components, and a second filtering section installed in the casing and composed mainly of activated carbon; and at least one of the other filters includes a casing having a water inlet and a water outlet, and at least one filtering section composed mainly of ion exchange resin, activated carbon, polyphosphate or the combination thereof, wherein the inlet and the outlet are formed such that one penetrates through the center of the other.

16. The refrigerator as claimed in claim 15, wherein the first filtering section for removing the scale-producing components is composed mainly of any one of ion exchange resin and polyphosphate.

17. The refrigerator as claimed in claim 16, wherein the casing is formed to have a hollow cylindrical shape, and the outlet is formed to penetrate through the center of the inlet.

18. The refrigerator as claimed in claim 13, wherein the heater includes:
a heater tube connected to the connection tube for allowing water to flow therein; and
a heating wire wrapped around an outer circumferential surface of the heater tube for generating heat through the application of electric power thereto.

19. The refrigerator as claimed in claim 13, wherein the heater includes:
a thermal energy storage tube installed to surround around an outer circumferential surface of the connection tube;
a thermal energy storage material provided within the thermal energy storage tube for transfer heat to the water flowing through the connection tube; and
a heating wire wrapped around an outer circumferential surface of the thermal energy storage tube for generating heat through the application of electric power thereto and transferring the heat to the thermal energy storage material.

20. The refrigerator as claimed in claim 13, wherein a plurality of heaters are provided; at least one of the filters includes a heater tube connected to the connection heater for allowing water to flow therein, and a heating wire wrapped around an outer circumferential surface of the heater tube for generating heat through the application of electric power thereto, and is provided at a end of the connection tube; and at least one of the other filters includes a thermal energy storage tube installed to surround around an outer circumferential surface of the connection tube, a thermal energy storage material provided within the thermal energy storage tube for transfer heat to the water flowing through the connection tube, and a heating wire wrapped around an outer circumferential surface of the thermal energy storage tube for generating heat through the application of electric power thereto and transferring the heat to the thermal energy storage material; and the plurality of heaters are provided with a front end of the connection tube.

21. The refrigerator as claimed in claim 13, wherein the feed tube extends into the door to penetrate through a lower hinge of the door.

22. The refrigerator as claimed in claim 13, wherein the door opens and closes a freezing chamber among the storage space.

23. A refrigerator including a main body for defining therein a storage space having refrigerating and freezing chambers and a door for opening and closing the storage space, comprising:
   a feed tube connected to an external water source for guiding water supplied through the main body of the refrigerator to the door;
   a cooling tank installed within the refrigerating chamber of the storage space defined in the main body of the refrigerator for cooling the water supplied through the feed tube and then storing the cooled water therein;
   a valve installed within the door for distributing the water supplied from the feed tube into a plurality of connection tubes;
   a heater installed within the door for receiving the water flowing through the valve into the connection tubes and then heating the received water;
   a dispenser for dispensing the hot and cold water supplied from the heater and cooling tank to the outside of the refrigerator through a front surface of the door; and
   a plurality of filters installed at a position on the feed tube for filtering the water supplied from the external water source.

24. The refrigerator as claimed in claim 23, wherein the filter is detachably installed either within the freezing chamber in the main body of the refrigerator or on the door.

25. The refrigerator as claimed in claim 24, wherein the filter includes:
   a casing having a water inlet and a water outlet penetrating through the center of the inlet;
   a first filtering section installed in the casing and composed mainly of any one of ion exchange resin or polyphosphate;
   a second filtering section installed in the casing and composed mainly of activated carbon; and
   a central passage extending through a longitudinal centerline of the casing for transferring water passing through the second filtering section to the outlet.

26. The refrigerator as claimed in claim 24, wherein the filter includes:
   a casing having a water inlet and a water outlet penetrating through the center of the inlet;
   at least one filtering section composed mainly of ion exchange resin, activated carbon, polyphosphate or the combination thereof;
   a central passage extending through a longitudinal centerline of the casing for transferring water passing through the second filtering section to the outlet; and
   a flange portion and support provided in the casing for supporting both ends of the filtering section.

27. The refrigerator as claimed in claim 24, wherein the heater includes:
   a heater tube connected to the connection tube for allowing water to flow therein; and
   a heating wire wrapped around an outer circumferential surface of the heater tube for generating heat through the application of electric power thereto.

28. The refrigerator as claimed in claim 24, wherein the heater includes:
   a thermal energy storage tube installed to surround an outer circumferential surface of the connection tube;
   a thermal energy storage material provided within the thermal energy storage tube for transfer heat to the water flowing through the connection tube; and
   a heating wire wrapped around an outer circumferential surface of the thermal energy storage tube for generating heat through the application of electric power thereto and transferring the heat to the thermal energy storage material.

29. The refrigerator as claimed in claim 24, wherein a plurality of heaters are provided; at least one of the filters includes a heater tube connected to the connection tube for allowing water to flow therein, and a heating wire wrapped around an outer circumferential surface of the heater tube for generating heat through the application of electric power thereto; and at least one of the other filters includes a thermal energy storage tube installed to surround around an outer circumferential surface of the connection tube, a thermal energy storage material provided within the thermal energy storage tube for transfer heat to the water flowing through the connection tube, and heating wires wrapped around an outer circumferential surface of the thermal energy storage tube for generating heat through the application of electric power thereto and transferring the heat to the thermal energy storage material.

30. The refrigerator as claimed in claim 23, wherein the plurality of connection tubes branched off from the valve are connected to the dispenser and the icemaker.

* * * * *